(12) United States Patent
Bodin et al.

(10) Patent No.: US 10,688,640 B2
(45) Date of Patent: Jun. 23, 2020

(54) MAGAZINE FOR A FASTENER TOOL

(71) Applicant: Illinois Tool Works Inc., Glenview, IL (US)

(72) Inventors: Christophe Bodin, Glenview, IL (US); Alain Vettoretti, Glenview, IL (US); Cyril Marion, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 196 days.

(21) Appl. No.: 15/967,816

(22) Filed: May 1, 2018

(65) Prior Publication Data
US 2018/0318993 A1    Nov. 8, 2018

(30) Foreign Application Priority Data

May 5, 2017   (EP) ..................................... 17169627

(51) Int. Cl.
*B25C 1/00*   (2006.01)
*B25C 5/16*   (2006.01)
*F16B 15/08*  (2006.01)

(52) U.S. Cl.
CPC .............. *B25C 1/003* (2013.01); *B25C 1/005* (2013.01); *B25C 5/1658* (2013.01); *F16B 15/08* (2013.01)

(58) Field of Classification Search
CPC ........ B25C 1/003; B25C 1/1665; B25C 1/005
USPC ....................... 227/8, 119, 126, 120; 206/338
See application file for complete search history.

(56) References Cited

U.S. PATENT DOCUMENTS

| 2002/0060233 | A1* | 5/2002 | Akiba .................... B25C 1/005 227/109 |
| 2007/0164075 | A1 | 7/2007 | Chen et al. |
| 2008/0061104 | A1 | 3/2008 | Lee |
| 2008/0067212 | A1 | 3/2008 | Wen |
| 2008/0264999 | A1* | 10/2008 | Lee ....................... B25C 5/1658 227/109 |
| 2009/0050667 | A1 | 2/2009 | Po |
| 2013/0320062 | A1 | 12/2013 | Segura |

FOREIGN PATENT DOCUMENTS

| FR | 2 920 332 | 4/2010 |
| WO | WO 2010/001286 | 1/2010 |

OTHER PUBLICATIONS

European Search Report from European Application No. EP 17169627.1, dated Oct. 25, 2017.

* cited by examiner

*Primary Examiner* — Nathaniel C Chukwurah
(74) *Attorney, Agent, or Firm* — Neal, Gerber & Eisenberg LLP

(57) ABSTRACT

A magazine for a fastener tool comprising a first guideway for heads of fastener elements of a first type, the first guideway extending in a direction (A) and being configured to position tips of the fastener elements of first type near a front edge extending substantially parallel to the direction (A); and comprising a second guideway for heads of fastener elements of a second type, the fastener elements of the first type having a different length from that of the fastener elements of second type, the second guideway being configured to position tips of the fastener elements of second type near the front edge. The magazine further comprises a poka-yoke configured to prevent inserting of the fastener elements of second type in the first guideway.

14 Claims, 4 Drawing Sheets

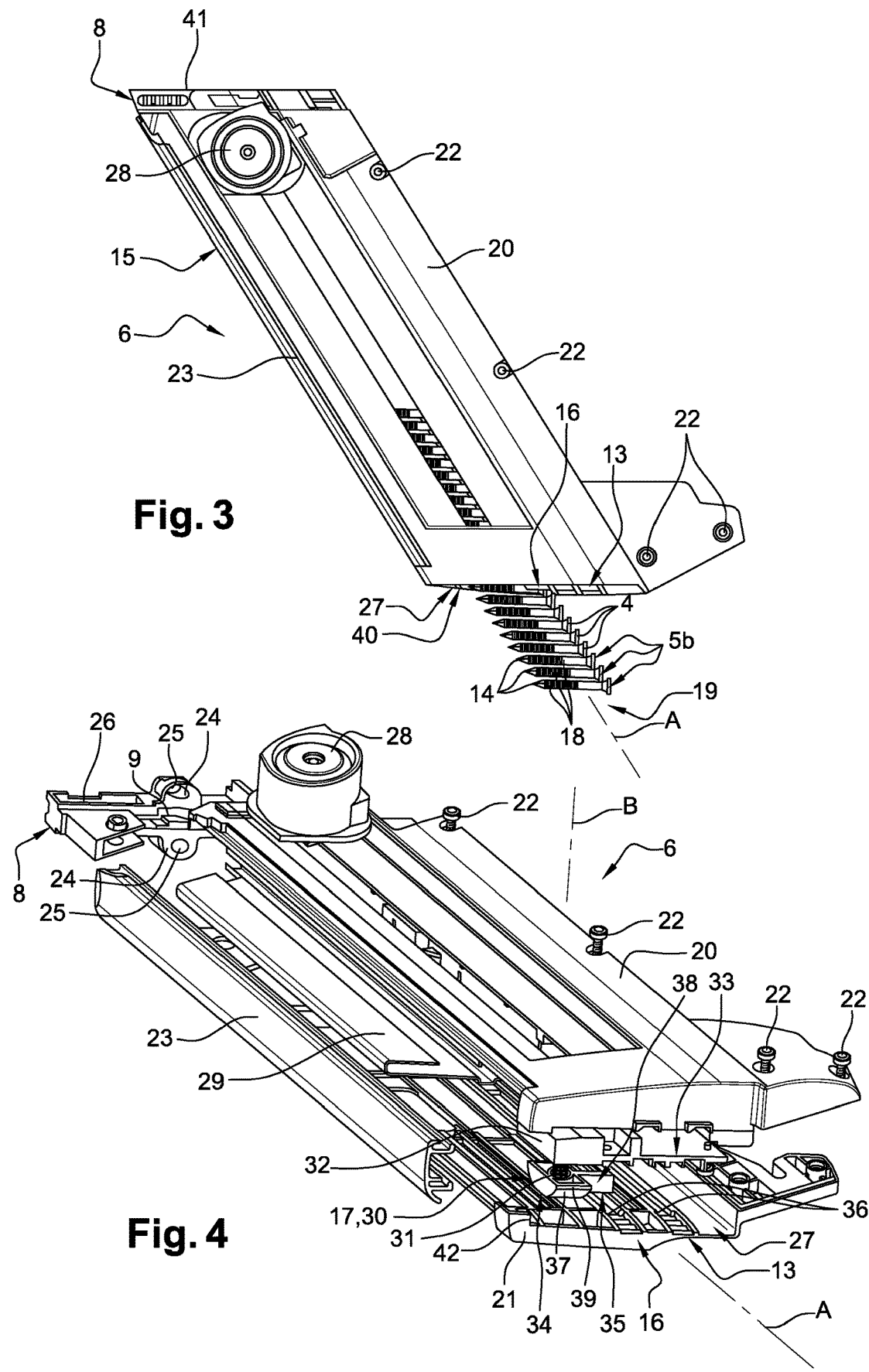

MAGAZINE FOR A FASTENER TOOL

PRIORITY

This application claims priority to and the benefit of EP Application No. 17169627.1, filed May 5, 2017, the entire contents of which is incorporated herein by reference.

TECHNICAL FIELD

The present disclosure pertains to a magazine of a fastener tool comprising at least two distinct guideways for the heads of fastener elements in a band of different lengths, these guideways being configured each so as to position the tips of the corresponding fastener elements near the front edge of the magazine, and a poka-yoke.

BACKGROUND

Fastener tools are tools making it possible to drive a fastener element (such as a staple, nail, tip, pin, etc.) into a support material (especially wood, concrete, or steel). For this, a moving blade strikes a fastener element (for example, in the area of the head in the case of a nail) that is present in a driving chamber in order to drive the latter so that it can become anchored in the support material. The blade is moved by a driving device utilizing, for example, thermal and/or electrical and/or pneumatic energy.

In general, such a tool comprises a nose (also called a guide tip) and a shear block (also called a connector or connecting block) bounding off the interior of the driving chamber. The shear block is an integral part of a magazine mounted to bear in removable manner against the nose of the tool. The fastener elements stored in the magazine are introduced one by one into the driving chamber through a feed slot made in the shear block.

In the case of a nail driving tool, the reloading is generally in the form of a band of nails, the nails being held together with a constant interval and held in position by suitable holding mechanisms, such as adhesive tape.

In general, when a reloading is guided in the magazine by the nail heads, the magazine comprises a single guideway regardless of the type of nails being driven, and especially when only the length of the nails to be driven varies.

As is described in document FR-B1-2920332 filed by the applicant, in keeping with the above described instance, the shear block comprises a device for adjusting the effective length of the feed slot of the driving chamber as a function of the length of the nails to be driven.

More precisely, the adjustment device is in the form of a folding flap blocking by default a portion of the feed slot of the driving chamber, the flap then occupying a so-called deployed position. This flap is in the present case configured to be cleared under the action of so-called long nails inserted into the magazine and thus to enable the latter to reach the driving chamber, the flap then occupying a so-called folded position.

During the process of using the nail driving tool, one finds on numerous occasions that the flap gets jammed in the folded position by the accumulation of adhesive tape residues in the gaps formed between the flap and the housing in which it is placed in the folded position.

This jamming of the flap in the folded position is a problem when so-called short nails are driven.

In fact, in this instance, after the striking of the nail by the blade, the blade is then liable to collide with the open edges of the feed slot (i.e., the portion not blocked), as a result of bending, and then to travel by the force of the impact either into the magazine, causing a jamming of the nail driving tool, or into the support material, requiring the user to replace the defective nail.

One notes that in the case described above, one speaks more commonly of a "hooking" of nails inside or outside the magazine.

An advantage of the present disclosure is to provide a magazine making it possible to remedy the above drawbacks.

SUMMARY

According to a first aspect, the present disclosure relates to a magazine for a fastener tool comprising a first guideway for the heads of fastener elements in a band of a first type, the first guideway extending in a direction A and being configured to position the tips of the fastener elements of first type near a front edge of the magazine extending substantially parallel to said direction A; characterized in that the magazine comprises a second guideway for the heads of fastener elements of a second type in a band, the fastener elements of the first type having a different length from that of the fastener elements of second type, the second guideway being substantially parallel and spaced apart from said first guideway, said second guideway being configured to position the tips of said fastener elements of second type near the front edge of the magazine, the magazine further comprising a poka-yoke configured to prevent the inserting of said fastener elements of second type in the first guideway.

Such a magazine makes it possible to position the tips of the stored nails near the front edge, regardless of the nails to be driven. Thus, it is no longer necessary to include the device for adjusting the effective length of the feed slot of the driving chamber in dependence on the length of the nails to be driven, which contributes to the reliability of the magazine and more generally of the tool.

Moreover, in order to prevent the user from mistaking the guideway when refilling the magazine, the latter comprises a poka-yoke, which contributes especially to the service life and productivity of the tool.

The magazine according to the present disclosure may comprise one or more of the following characteristics, taken alone or in combination with each other:
- the poka-yoke comprises a member mounted on the return mechanism in a housing of the magazine, the member being able to locate said fastener elements of the first and second type;
- the member comprises:
  - a first portion having a shape designed to retract the member on the one hand when the fastener elements of the second type are introduced into the second guideway and make contact with the first portion, and on the other hand when the fastener elements of the first type are introduced into the first guideway and make contact with the first portion;
  - a second portion having a shape configured to oppose the fastener elements of the second type when they are introduced into the first guideway;
- the first portion has a curved surface of contact with the fastener elements and the second portion has a planar surface of contact with the fastener elements;
- the curved surface has a constant profile along a direction of extension substantially parallel to a direction of elongation of the fastener elements when they are introduced into the magazine and the planar surface is substantially parallel to the direction of elongation;

the curved surface is substantially semi-cylindrical;

the first portion comprises a parallelepiped base in direct contact with the return mechanism and lodged at least partly in the housing of the magazine;

the planar surface is recessed with respect to the curved surface, along the direction;

the first portion of the member is integrally made of material with the second portion;

the magazine comprises a first shell and a second complementary shell, forming on the inside a storage compartment for the fastener elements in which at least part of the member sticks out, the shells being mounted with respect to each other along a mounting direction, the member being able to be retracted in its housing along the direction;

each of the guideways is formed by two grooves facing each other and respectively devised at least partly in the first and second shells; and the housing is defined in a partition held in position between the first and second shells.

According to a second aspect, the present disclosure relates to a fastener tool comprising a magazine as described above.

BRIEF DESCRIPTION OF THE FIGURES

The present disclosure will be better understood and other details, characteristics and advantages of the present disclosure will appear more clearly upon reading the following description, given as a nonlimiting example and making reference to the drawings, in which:

FIG. 3 is a front view illustrating the introduction of a reloading of short nails in the magazine;

FIG. 4 is an exploded perspective view of the magazine;

DETAILED DESCRIPTION

Figure 1:
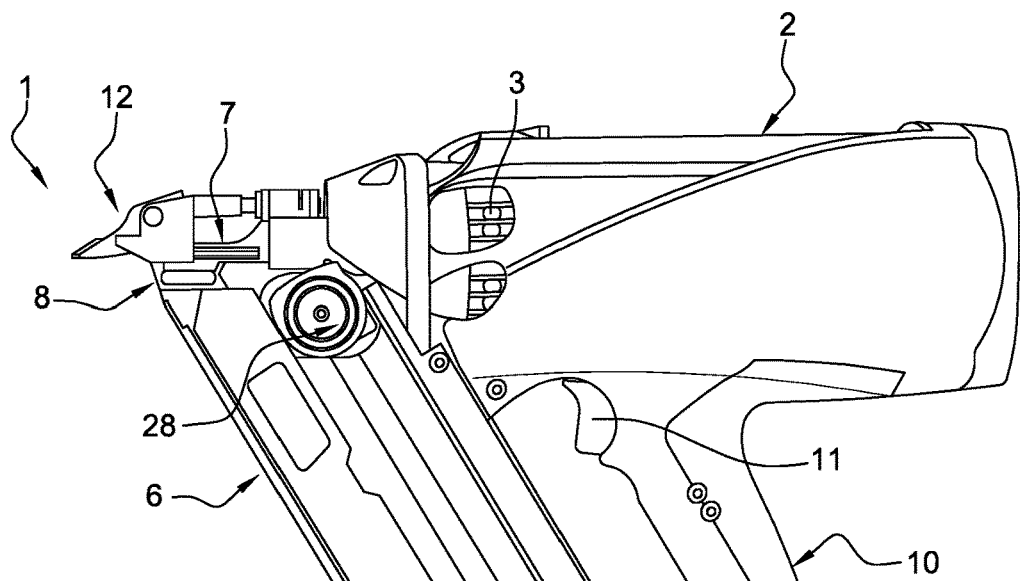
FIG. 1 is a front view of an example fastener tool comprising a magazine according to one embodiment of the present disclosure.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the disclosure as taught herein and understood by one of ordinary skill in the art. The drawings are not to scale unless noted otherwise.

The example fastener tool 1 represented in FIG. 1 is in the present case a nail driving tool 1.

As illustrated in FIG. 1, the tool 1 comprises a housing 2 in which is found a driving device 3 configured to actuate a blade. The blade in the present case is able to strike the head 4 of a nail, which is present in a driving chamber and extracted from a supply magazine 6, in order to drive this nail so that it can be anchored in a support material.

At the front of the housing 2, a nose 7 and a shear block 8 bound off the interior of the driving chamber and a mouth through which the nail leaves the chamber. The shear block 8 is an integral part of the magazine 6, mounted to bear, in a removable manner, against the nose 7 of the tool 1. The nails 5a or 5b stored in the magazine 6 are introduced one by one into the driving chamber through a feed slot 9 devised in the shear block 8.

The tool 1 furthermore comprises a handle 10 for grasping and manipulating, formed by the housing 2. An actuating trigger 11 situated in the top part of the handle 10 enables the user to initiate the driving, provided that a sensor 12 is switched on.

The magazine 6 comprises a first guideway 13 for heads 4 of nails 5a in a band of a first type, the first guideway 13 extending in a direction A and being configured to position the tips 14 of the nails 5a of the first type near a front edge 15 of the magazine 6, extending substantially parallel to the direction A.

The magazine 6 further comprises a second guideway 16 for heads 4 of nails 5b of a second type in a band, the nails 5a of the first type having a different length from that of the nails 5b of second type, the second guideway 16 being substantially parallel and spaced apart from the first guideway 13, the second guideway 16 being configured to position the tips 14 of the nails 5b of second type near the front edge 15 of the magazine 6.

The magazine 6 also comprises a poka-yoke 17 configured to prevent the introducing of the nails 5b of second type into the first guideway 13.

Figure 2:
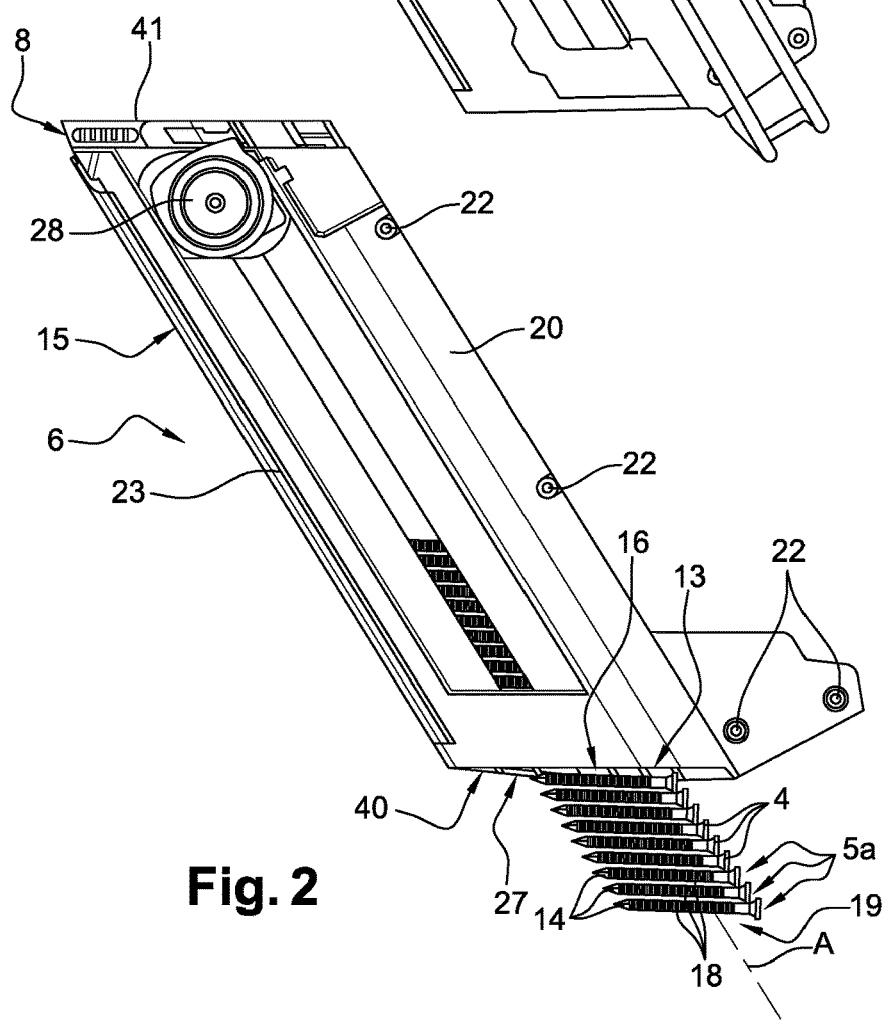
FIG. 2 is a front view illustrating the introduction of a reloading of long nails in the magazine.

The terms "front", "rear", "lower" and "upper" associated with the magazine 6 are defined in relation to a magazine 6 mounted on the tool 1, the latter being situated in a conventional operating position, as illustrated in FIGS. 1 to 3.

The tool 1 in the present example is configured to drive nails 5a or 5b in a band of first and second types.

Figure 5:
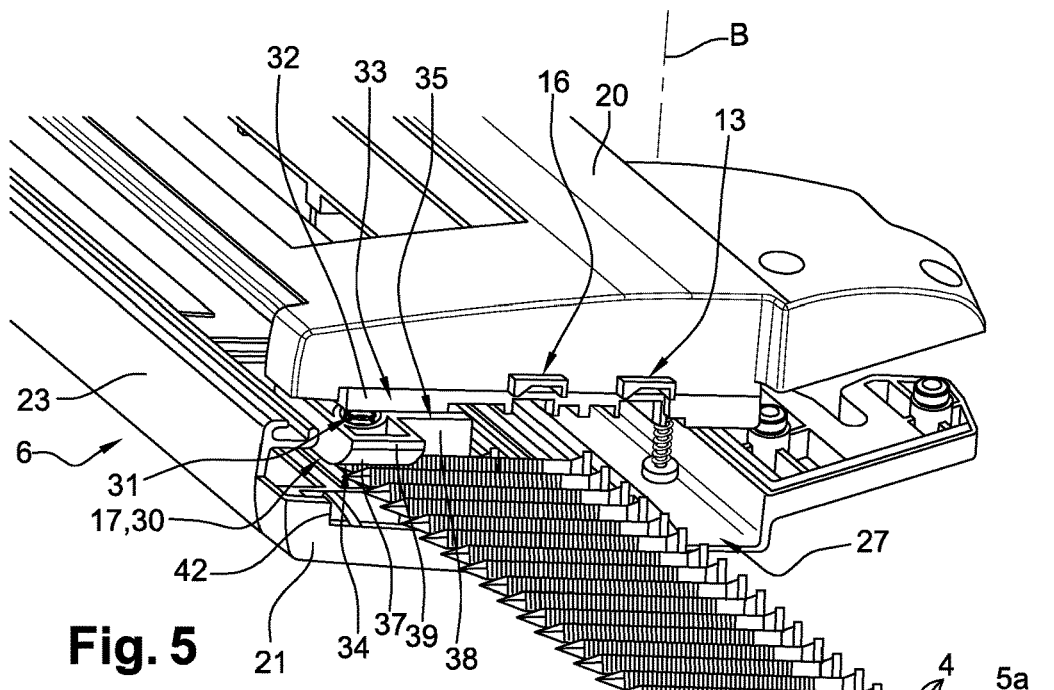
FIG. 5 is a partly exploded perspective view illustrating the behavior of a poka-yoke of the magazine when introducing long nails in a first guideway of the magazine.
Figure 6:
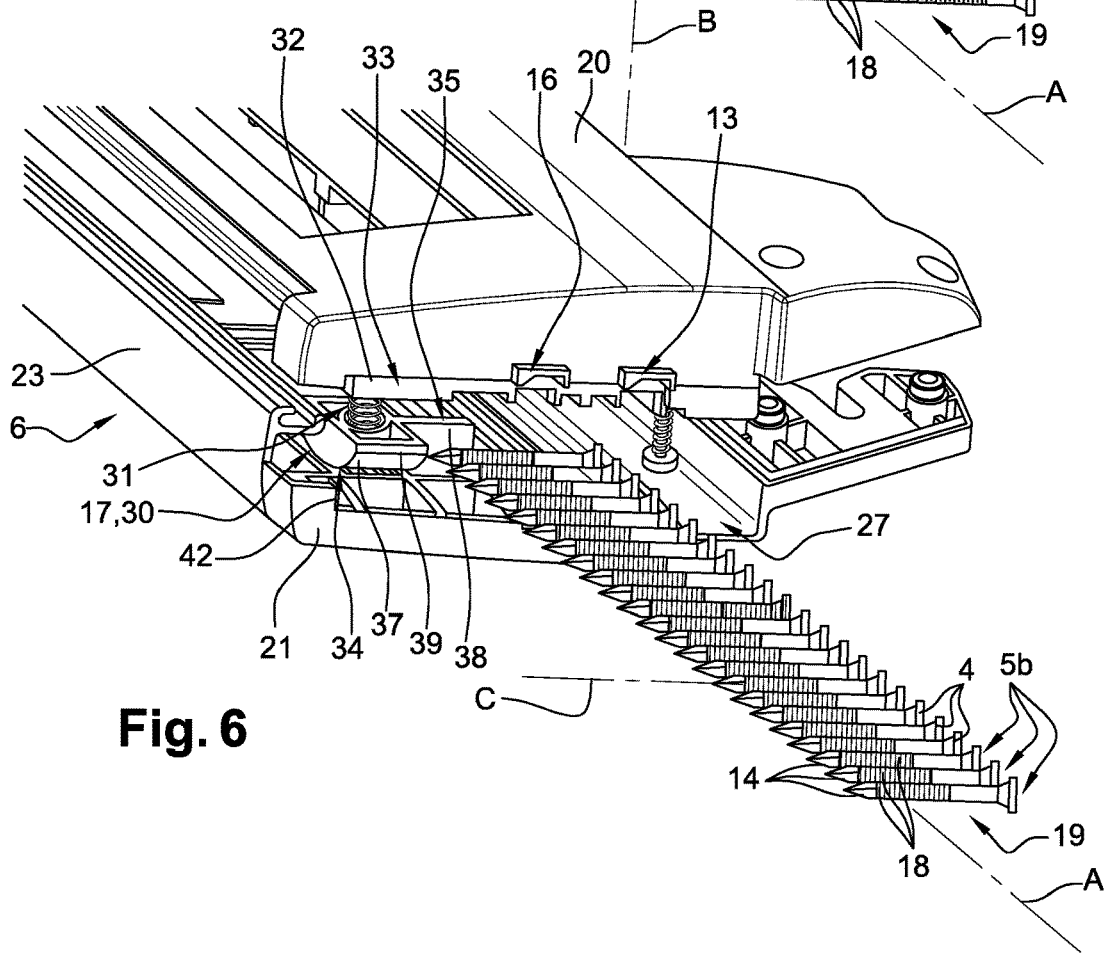
FIG. 6 is a partly exploded perspective view illustrating the behavior of the poka-yoke when introducing short nails in the first guideway of the magazine.
Figure 7:
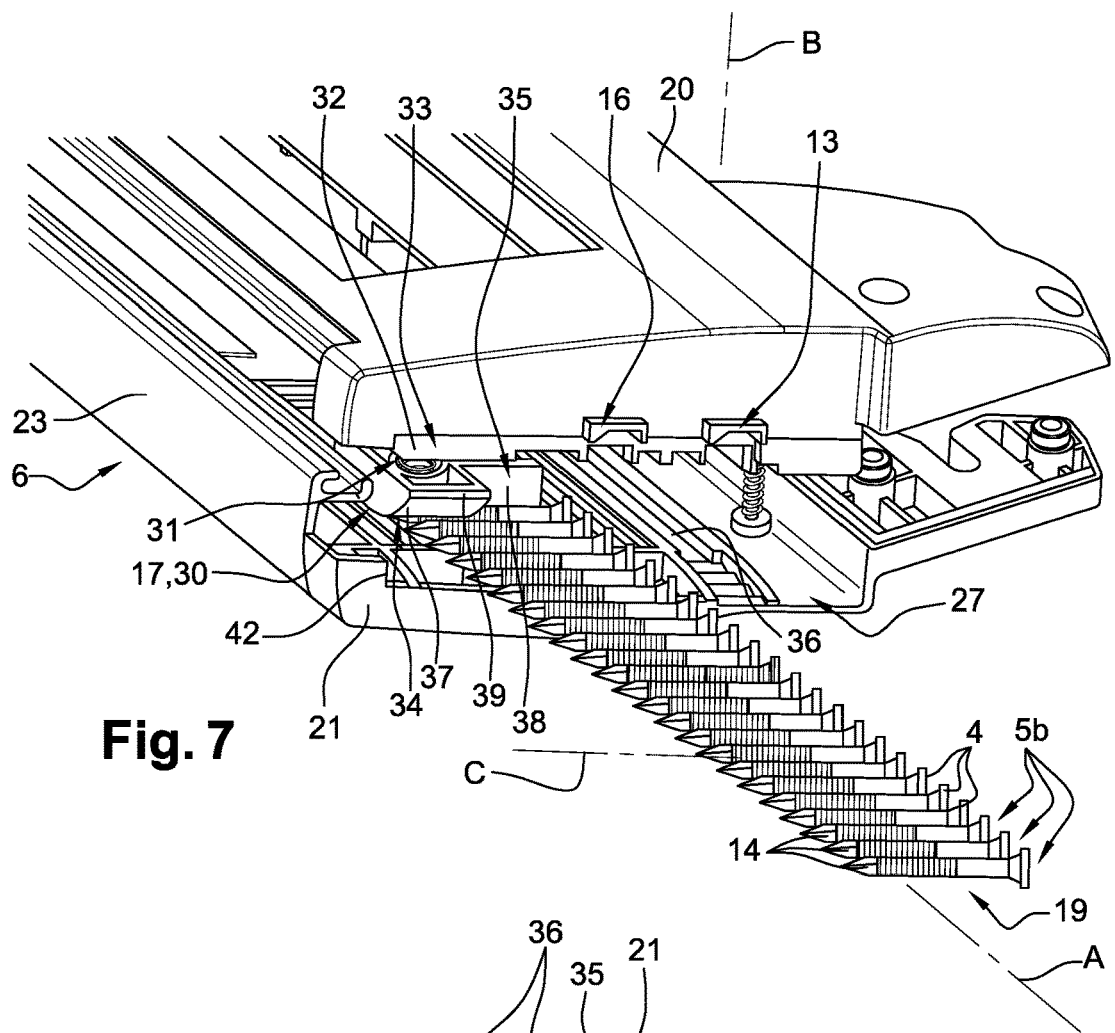
FIG. 7 is a partly exploded perspective view illustrating the behavior of the poka-yoke when introducing short nails in a second guideway of the magazine.

According to the embodiment illustrated in the figures, the nails of first type 5a and the nails of second type 5b differ solely in their dimensional characteristics and, more precisely, in their length, namely, the first type of so-called "long nails 5a" (as shown in FIGS. 2 and 5) has a greater length than the second type of so-called "short nails 5b" (as shown in FIGS. 3, 6, and 7).

The nails 5a or 5b represented in the figures are intended to secure a first metallic element to a wooden element. The metallic element is for example a connector, a shoe, a bracket, etc. The wooden element is for example a lintel, a lath, a counter lath, a batten, etc. The nails 5a or 5b in particular have the following geometrical and mechanical characteristics:

a round head 4;

a shaft 18 centered relative to the head 4 and for the most part ribbed;

a tip 14 with four slanting facets; and the nail is made of hardened steel, such as galvanized steel.

However, the embodiment illustrated in the figures is in no way limiting, so that in addition to the length, the nails of the first and second type could have different characteristics, especially as regarding the dimensions, the geometry, and the mechanical properties.

As an example, in regard to the geometry of a nail, the head may in particular have a round shape or a D shape. The shaft may be centered or off-center with respect to the head. The shaft can be in particular smooth, ribbed, or twisted.

As is illustrated in the figures, a reload 19 is in the form of a band of nails 5a or 5b, the nails 5a or 5b being glued to each other with a constant interval and held in position by adhesive paper tapes (not shown). The nails 5a or 5b are slanted with respect to the direction of extension of the adhesive tapes.

In the embodiment illustrated in the figures, the magazine 6 is of parallelepiped shape and comprises a first shell 20 and a second complementary shell 21 so as to form a housing. The shells 20 and 21 are mounted with respect to each other along a mounting direction B, these shells 20 and 21 defining on the inside a storage compartment for the nails 5a or 5b to be driven. The shells 20 and 21 enclose a lower portion of the shear block 8, such that the latter is an integral part of the magazine 6 and an upper portion protrudes with respect to the shells 20 and 21. The shells 20 and 21 are held in position against each other, in the rear portion, by several screws 22 distributed along the height of the magazine 6. Furthermore, the shells 20 and 21 are held in position, in the front portion, by a maintaining channel 23 extending for the entire height of the magazine 6. The channel 23 defines the front edge 15 of the magazine 6.

In order to ensure the positioning of the shear block 8 in relation to the nose 7, the upper portion of the shear block 8 comprises two lugs 24 arranged on either side of the feed slot 9, each of them comprising a bore 25 configured to receive a pin of complementary shape, formed in the nose 7 of the tool 1. Moreover, the upper portion of the shear block 8 comprises two notches 26 arranged on either side of the feed slot 9, each of them being able to receive a tooth of complementary shape formed in the nose 7 of the tool 1.

As illustrated in FIGS. 2 to 7, the magazine 6 comprises a lower opening 27 bounded by the shells 20 and 21 and through which the nails 5a or 5b in a band are inserted in the direction A, the direction A thus corresponding to the direction of introduction (or emptying) of the nails 5a or 5b in the magazine 6. The magazine 6 further comprises a lifter 28 making it possible in particular to lift the reload 19 of nails 5a or 5b after each nail is driven, and in other words to reload the driving chamber. The magazine 6 also has a guide 29 placed in the storage compartment, the guide 29 making it possible to give the stored nails 5a or 5b a trajectory.

As is illustrated in FIG. 6, the poka-yoke 17 is configured to prevent the introducing of the short nails 5b in the first guideway 13, the first guideway 13 being intended for the guiding of the long nails 5a.

The poka-yoke 17 comprises a member 30 mounted on the return mechanism 31 in a housing 32 of the magazine 6, the member 30 being able to locate the short and long nails 5b or 5a inserted in the magazine 6.

As illustrated in FIGS. 4 to 7, the member 30 is mounted on a cylindrical compression spring 31 in its housing 32 such that the member 30 is by default in the extended position under the force of the spring 31 (spring 31 at rest), the member 30 then being in abutment against the second shell 21. The member 30 is situated near the opening 27 for insertion of the bands of nails 5a or 5b. The housing 32 is defined in a partition 33 maintained in position between the shells 20 and 21, and in the present case secured to the first shell 20.

The member 30 comprises a first portion 34 having a shape configured to retract the member 30 on the one hand when the short nails 5b are introduced into the second guideway 16 and make contact with the first portion 34 (FIG. 7), and on the other hand when the long nails 5a are introduced into the first guideway 13 and make contact with the first portion 34 (FIG. 5).

The member 30 further comprises a second portion 35 having a shape configured to oppose the short nails 5b when they are introduced into the first guideway 13 (FIG. 6).

As illustrated in FIGS. 5 to 8, the arrangement of the poka-yoke 17 with respect to the guideways 13 and 16 as well as the profile of the poka-yoke 17 are determined such that the first portion 34 of the member 30 is hit by the short nails 5b when they are introduced into the second guideway 16 (FIG. 7) and by the long nails 5a when they are introduced into the first guideway 13 (FIG. 5). Moreover, the second portion 35 of the member 30 is hit by the short nails 5b when they are introduced into the first guideway 13 (FIG. 6).

As illustrated in FIG. 4, from front to rear, the magazine 6 comprises the poka-yoke 17, the first guideway 13 and then the second guideway 16. Each of the guideways 13 and 16 is formed by two grooves 36 facing each other and devised respectively in the first and second shells 20 and 21.

The contact surface 37 of the first portion 34 is profiled such that the direction of the force exerted by the nails 5a and 5b on the first portion 34 (during the contact between the nails and the first portion) is substantially parallel to the direction B so as to retract the poka-yoke 17 and enable the passage of the nails 5a or 5b in the storage compartment (FIGS. 5 and 7).

On the contrary, the contact surface 38 of the second portion 35 is profiled such that the direction of the force exerted by the nails 5b on the second portion 35 (during the contact between the nails and the second portion) is substantially perpendicular to the direction B so as to immobilize the poka-yoke 17, which then opposes the passage of the nails 5b in the storage compartment (FIG. 6).

Figure 8:
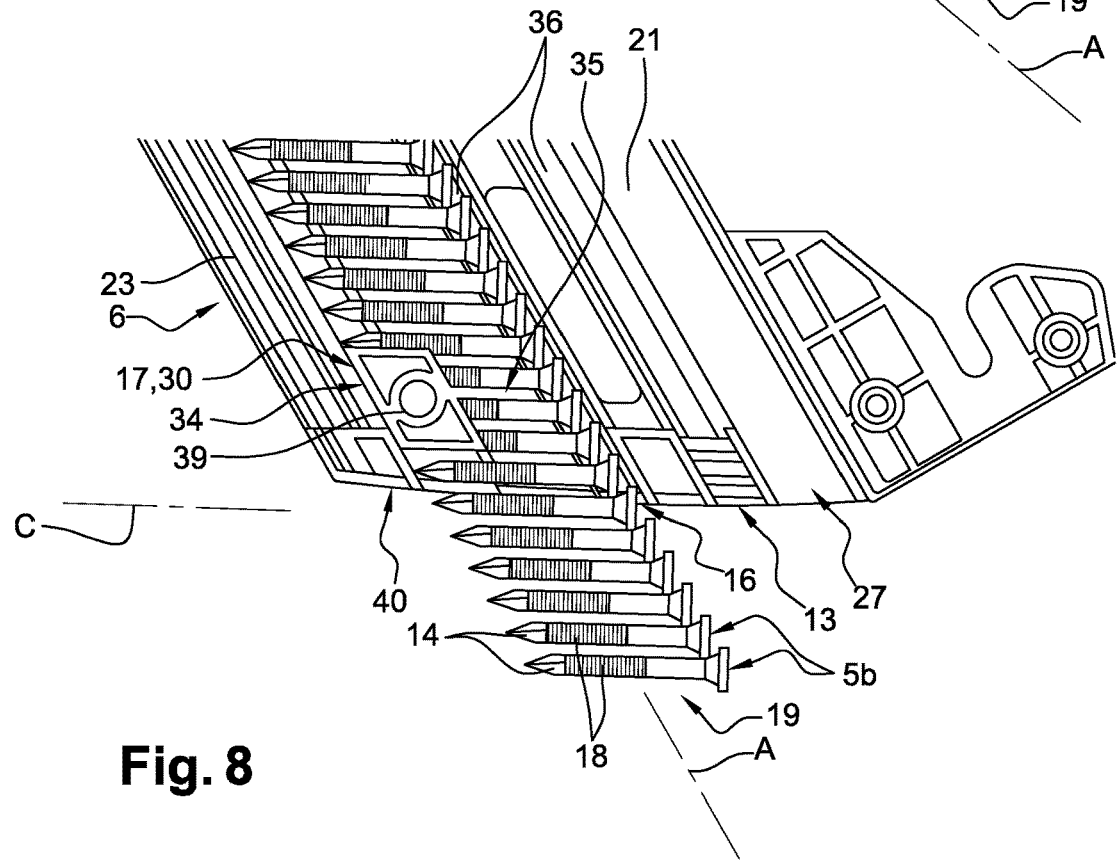
FIG. 8 is a front view of FIG. 7, in which the upper portion of the magazine has been concealed.

As is illustrated in FIGS. 4 to 8, the first portion 34 has a curved contact surface 37 with the nails 5a or 5b, and more precisely a substantially semi-cylindrical one. The curved surface 37 has a constant profile in a direction of extension substantially parallel to a direction of elongation C of the nails 5a or 5b when they are respectively introduced into the magazine 6. The curved surface 37 overhangs a parallelepiped base 39 directly in contact with the spring 31 and lodged in the housing 32 of the magazine 6. Referring to FIG. 8, the flanks of the first portion 34 are substantially parallel to the front edge 15 of the magazine 6 (and in other words to the direction A).

As is illustrated in FIGS. 4 to 8, the second portion 35 has a planar surface of contact 38 with the nails 5b. The planar surface 38 is recessed in relation to the curved surface 37, along the direction A. In front view (FIGS. 1 to 3), the planar surface 38 is substantially parallel to the direction of elongation C of the nails 5b when they are introduced into the magazine 6, and in other words the planar surface 38 is substantially parallel to the plane defined by a lower planar edge 40 or a planar mating surface 41 of the shear block 8 with the nose 7 of the tool 1.

As is illustrated in the figures, when the spring 31 is at rest, the member 30 extends into the storage compartment so that the contact surfaces 37 and 38 of the first and second portions 34 and 35 are facing the opening 27 for inserting of the bands of nails 5*a* or 5*b*. This disposition guarantees that when a band 19 of nails (short nails 5*b* or long nails 5*a*) is inserted, it will come into contact with the member 30. The poka-yoke 17 is configured to enable the emptying of the feed magazine 6. The member 30 is thus substantially symmetrical along a plane passing through the planar surface 38 of the second portion 35.

As is illustrated in the figures, the first portion 34 of the member 30 is made integrally of material with the second portion 35. As a variant, the first and second portions 34 and 35 might be made independently of each other and then assembled by way of fixation.

The introduction of long nails 5*a* in the second guideway 16 is not possible. In fact, in such an instance, the shafts 18 of the long nails 5*a* will hit a front limit 42 of the opening 27 so as to prevent their introduction. The user will remedy this situation by intuitively introducing the long nails 5*a* in the first guideway 13.

It will be understood that modifications and variations may be effected without departing from the scope of the novel concepts of the present invention, and it is understood that this application is to be limited only by the scope of the claims.

The invention claimed is:

1. A magazine for a fastener tool comprising:
   a first guideway for heads of fastener elements of a first type in a first band, the first guideway extending in a direction (A) and being configured to position tips of the fastener elements of the first type near a front edge of the magazine extending substantially parallel to the direction (A);
   a second guideway for heads of fastener elements of a second type in a second band, the fastener elements of the first type having a different length from that of the fastener elements of the second type, the second guideway being substantially parallel and spaced apart from the first guideway, the second guideway being configured to position tips of the fastener elements of the second type near the front edge of the magazine; and
   a poka-yoke configured to prevent inserting of the fastener elements of the second type in the first guideway;
   wherein the poka-yoke comprises a member mounted on a return mechanism in a housing of the magazine, the member being configured to locate the fastener elements of the first type and of the second type.

2. The magazine of claim 1, wherein the member comprises:
   a first portion having a shape configured to facilitate retraction of the member when the fastener elements of the second type are introduced into the second guideway and make contact with the first portion, and when the fastener elements of the first type are introduced into the first guideway and make contact with the first portion; and
   a second portion having a shape configured to not facilitate retraction of the member and oppose the fastener elements of the second type when fastener elements of the second type are introduced into the first guideway.

3. The magazine of claim 2, wherein the first portion has a curved contact surface with the fastener elements and the second portion has a planar contact surface with the fastener elements.

4. The magazine of claim 3, wherein the curved contact surface has a constant profile along a direction of extension substantially parallel to a direction of elongation (C) of the fastener elements, and wherein the planar contact surface is substantially parallel to the direction of elongation (C).

5. The magazine of claim 3, wherein the curved contact surface is substantially semi-cylindrical.

6. The magazine of claim 3, wherein the first portion comprises a parallelepiped base in direct contact with the return mechanism and lodged at least partly in the housing of the magazine.

7. The magazine of claim 3, wherein the planar contact surface is recessed with respect to the curved contact surface, along the direction (A).

8. The magazine of claim 3, wherein the first portion of the member is integrally made with the second portion.

9. The magazine of claim 3, which includes a first shell and a second complementary shell forming a storage compartment on an inside of the magazine for the fastener elements in which at least part of the member sticks out, the shells being mounted with respect to each other along a mounting direction (B), the member being retractable in its housing along the mounting direction (B).

10. The magazine of claim 9, wherein each of the guideways is formed by two grooves facing each other and respectively at least partly in the first and second shells.

11. The magazine of claim 10, wherein the housing is defined in a partition held in position between the first and second shells.

12. A fastener tool comprising a magazine of claim 11.

13. A fastener tool comprising a magazine of claim 3.

14. A fastener tool comprising a magazine of claim 1.

* * * * *